(12) United States Patent
Huang et al.

(10) Patent No.: US 11,440,798 B2
(45) Date of Patent: Sep. 13, 2022

(54) PROCESS SYSTEM AND PROCESS METHOD FOR CONVERSION OF SULFUR-CONTAINING FLUE GAS TO SULFURIC ACID

(71) Applicants: KEYON PROCESS CO., LTD, Shanghai (CN); Rui Huang, Shanghai (CN)

(72) Inventors: Rui Huang, Shanghai (CN); Dan Wang, Shanghai (CN); Huayong Zhang, Shanghai (CN); Yuan Zhang, Shanghai (CN); Junling Qi, Shanghai (CN)

(73) Assignees: KEYON PROCESS CO., LTD, Shanghai (CN); Rui Huang, Shanghai (CN)

( * ) Notice: Subject to any disclaimer, the term of this patent is extended or adjusted under 35 U.S.C. 154(b) by 0 days.

(21) Appl. No.: 17/413,953

(22) PCT Filed: Nov. 21, 2019

(86) PCT No.: PCT/CN2019/119983
§ 371 (c)(1),
(2) Date: Jun. 15, 2021

(87) PCT Pub. No.: WO2020/134751
PCT Pub. Date: Jul. 2, 2020

(65) Prior Publication Data
US 2021/0309519 A1 Oct. 7, 2021

(30) Foreign Application Priority Data

Dec. 26, 2018 (CN) .......................... 201811600891.9
Dec. 26, 2018 (CN) .......................... 201822211197.X

(51) Int. Cl.
*C01B 17/79* (2006.01)
*C01B 17/80* (2006.01)

(52) U.S. Cl.
CPC ............ *C01B 17/806* (2013.01); *C01B 17/79* (2013.01); *C01B 2210/0004* (2013.01); *C01B 2210/0009* (2013.01)

(58) Field of Classification Search
CPC .......... B01D 53/002; B01D 2258/0283; B01D 53/343; B01D 2255/9032; B01D 53/8609; B01D 2255/20723; C01B 17/806; C01B 2210/0004; C01B 17/79; C01B 17/80; C01B 17/76; C01B 2210/0009
See application file for complete search history.

(56) References Cited

FOREIGN PATENT DOCUMENTS

| CN | 103626136 A | 3/2014 |
|---|---|---|
| CN | 109516442 A | 3/2019 |
| CN | 209396887 U | 9/2019 |
| JP | S55155727 A | 12/1980 |

OTHER PUBLICATIONS

Jan. 10, 2021 International Search Report issued in International Patent Application No. PCT/CN2019/119983.
Jan. 10, 2021 Written Opinion of the International Searching Authority issued in International Patent Application No. PCT/CN2019/119983.

*Primary Examiner* — Timothy C Vanoy
(74) *Attorney, Agent, or Firm* — Houston Beshining Law Office PLLC; Liangang Ye

(57) ABSTRACT

Disclosed is a process system and a process for converting the sulfur-containing flue gas into the sulfuric acid. The process system comprises: a flue gas preheater, which for preheating the sulfur-containing flue gas to 15~30° C. above its dew point, and the flue gas preheater has a glass tube as a heat exchange tube; a flue gas fan for boosting the pressure of the preheated acid process gas and transporting one part of which to a combustion furnace, and the other part of which to a process gas steam heater; a sulfuric acid steam condenser for condensing $SO_3$ generated by the combined reactor into sulfuric acid. The device of the present invention can resist the fluctuation of $SO_2$ concentration in the feed gas, and can realize considerable economic benefits and rational utilization of energy.

17 Claims, 2 Drawing Sheets

PROCESS SYSTEM AND PROCESS METHOD FOR CONVERSION OF SULFUR-CONTAINING FLUE GAS TO SULFURIC ACID

The present application is a National Stage of International Application No. PCT/CN2019/119983, filed on Nov. 21, 2019, which claims priority of China patent application No. 201811600891.9, filed on Dec. 26, 2018 and the China patent application No. 201822211197.X filed on Dec. 26, 2018, the contents of which are incorporated herein by reference in their entireties.

TECHNICAL FIELD

The present invention relates to the technical field of smelting sulfur-containing flue gas treatment, in particular to a process system and process for converting sulfur-containing flue gas into sulfuric acid.

BACKGROUND ARTS $SO_2$ is one of the main pollutants in the atmosphere, which is an important indicator of whether the atmosphere is polluted. Sulfur dioxide is a serious health hazard and a major source of acid rain, which damage the ecological environment. There are various sources of $SO_2$ feed gas, most of which come from the combustion of sulfur-containing fuels. The front-end processing of desulfurization is the desulfurization of sulfur-containing fuels, and the back-end processing is the desulfurization of sulfur-containing flue gas. At present, smelting sulfur-containing flue gas can not meet the existing relevant standards for emission.

The common desulfurization techniques for smelting sulfur-containing flue gas comprises wet method, dry method and semi-dry method. Dry and semi-dry desulfurization have slow reaction speed, low desulfurization efficiency, difficulty in device maintenance, and more restrictions on use. Dry method and semi-dry method also have disadvantages such as complex process, low energy utilization rate, complex operation, large land occupation and the production of a small amount of waste acid. At present, a method of the molten salt heat transfer is used for the smelting flue gas treatment in foreign wet acid process. However, molten salt is a hazardous waste, which is very corrosive to device. At the same time, the foreign technology further has the defects of high energy consumption and high cost.

CONTENT OF THE PRESENT INVENTION

The technical problem to be solved by the present invention is to overcome the defects of the prior art, such as high energy consumption and large equipment corrosion in the device for treating a low concentration of smelting sulfur-containing flue gas, and to provide a production system and production process for converting sulfur-containing flue gas into sulfuric acid. The process of the present invention can resist the fluctuation of $SO_2$ concentration in the feed gas, and can achieve considerable economic benefits and rational utilization of energy of the device. Moreover, the process and the device are simple, while the investment and the operation cost of device are low.

The present invention provides a process system for converting sulfur-containing flue gas into sulfuric acid. The process system comprise:

a flue gas preheater for preheating the sulfur-containing flue gas to 15~30° C. above its dew point, wherein the flue gas preheater has a glass tube as a heat exchange tube;

a flue gas fan for boosting the pressure of the preheated acid process gas from the flue gas preheater, and transporting one part of which to a combustion furnace, and the other part of which to a process gas steam heater, wherein the combustion furnace and the process gas steam heater are used for heating the preheated acid process gas to catalytic oxidation temperature of $SO_2$;

the combustion furnace and the process gas steam heater are connected in parallel with a combined reactor, which is used for generating $SO_3$ by catalytic oxidation of $SO_2$ in the acid process gas;

a sulfuric acid steam condenser for condensing $SO_3$ generated by the combined reactor into sulfuric acid; the cold end of the sulfuric acid steam condenser is further connected with the flue gas preheater for providing hot air to the flue gas preheater.

The process system of the present invention is further described below:

In the embodiments of the present invention, the low concentration of smelting sulfur-containing flue gas is heated by setting a flue gas preheater. The low concentration of smelting sulfur-containing flue gas after the front end cooling, de-dusting, cooling and purification is generally entrained with dilute sulfuric acid with strong corrosive. The dew point is generally around 120~150° C., in order to avoid the corrosion of subsequent device and reduce the investment of subsequent devices, and the flue gas preheater is set to preheat acidic process gas to 15~30° C. above the dew point.

In the embodiments of the present invention, the heat exchanger tube of the flue gas preheater is made of glass tube, which can effectively avoid corroding the device by acid gas.

In the embodiments of the present invention, the flue gas preheater uses hot air from the cold end of the sulfuric acid steam as the heat source, which improves the heat utilization rate and reduces the energy consumption of the device.

In the embodiments of the present invention, a flue gas fan is arranged behind the flue gas preheater. The acid process gas preheated by the flue gas preheater is 15~30° C. above the dew point. Therefore, the corrosion of the acid process gas has been minimized, and the flue gas fan can be effectively protected from the corrosion of the acid process gas and ensure its long period of operation.

In the embodiments of the present invention, the pressure of the acid process gas is boosted to adopt the shunt measure, and the fuel gas and its by-product steam are respectively used to heat the acid process gas to the optimal reaction temperature of the $SO_2$ catalyst. When the acid process gas has a low concentration of $SO_2$, the heat of the system reaction cannot satisfy the autothermal equilibrium, then the flow to the combustion furnace will be a little more. This allows heat to be obtained by burning the external fuel gas. When the acid process gas has a high concentration of $SO_2$, the heat of the system reaction can satisfy the autothermal equilibrium, then the flow to the combustion furnace will be a little less. This ensures that no matter how the $SO_2$ concentration in the acid process gas fluctuates, the temperature of the acid process gas entering the catalyst reaches the optimal reaction temperature. After the acid process gas is shunted, the flow rate into the combustion furnace is reduced, so the size of the combustion furnace is reduced and the investment can be saved. When the sulfur concentration of the feed gas is relatively low, the fuel gas will be added to maintain the thermal equilibrium of the system. When the sulfur concentration of which is relatively high, less fuel gas is required.

In the embodiments of the present invention, a combustion furnace is specially arranged. The acid process gas, fuel gas and hot air enter the combustion furnace together and burn to 900~1200° C., which can not only provide enough heat under the low concentration of $SO_2$ in the acid process gas, but further can be used as a start-up heating furnace.

Preferably, the combustion furnace is further provided with a waste heat recycler for converting the heat of the high-temperature flue gas in the combustion furnace into saturated steam. The waste heat recycler uses a shell and tube heat exchanger, with all the heat exchange tubes submerged in the boiler feed water generating 5.0~5.8 MPag medium pressure saturated steam outside the heat exchange tubes.

On this basis, preferably, the combined reactor is provided with a first bed, an interstage steam superheater, a second bed and a process gas cooler from top to bottom, and the waste heat recycler and the process gas steam heater are connected with the first bed after being paralleled connected. The outlet of the interstage steam superheater is further connected with the hot end of the process gas steam heater, and the superheated steam is used for a heating process of the acid process gas. The superheated steam after the heating of the interstage steam superheater is divided into two streams: one stream is sent out of the boundary as the final steam product; the other stream is sent to the process gas steam heater as a heat source to heat up the acid process gas, which condenses itself into saturated condensed water and is sent out of the boundary area.

The process is described as follows: the acid process gas from the waste heat recycler and the process gas steam heater are mixed and enter the first bed inlet of the combined reactor, and the $SO_2$ is converted to $SO_3$ under the catalysis of the catalyst. This reaction process is a strong exothermic reaction, so the temperature of the acid process gas leaving the first bed of the combined reactor is relatively increased. The acid process gas from the outlet of the first bed of the combined reactor enters into the shell side of the interstage steam superheater for cooling and heat recovery.

Preferably, the process system further comprises a steam drum, wherein the steam drum and the waste heat recycler are connected to form a first waste heat collection circuit, the steam drum and the process gas cooler are connected to form a second waste heat collection circuit, and the steam drum is further connected to the interstage steam superheater, so that the saturated steam from the steam drum enters the cold end of the interstage steam superheater to recover heat generated by acid process gas reaction.

The acid process gas is cooled by the interstage steam superheater to recover the heat and then enters the second bed inlet of the combined reactor. $SO_2$ in the acid process gas is further converted. After the reaction in the second bed of the combined reactor, the acid process gas enters into the process gas cooler for cooling. The cold end of the process gas cooler uses a circulating boiler feed water from the steam drum. The circulating boiler feed water and the acid process gas exchange heat and then vaporizes and returns to the steam drum for flash evaporation to generate 5.0~5.8 MPag medium pressure saturated steam.

The acid process gas passing through the process gas cooler is sent to the sulfuric acid steam condenser for condensation into acid. In this process, gaseous $SO_3$ is combined with water to form sulfuric acid and condensed to form 93~98% concentrated sulfuric acid.

Preferably, the sulfuric acid steam condenser comprises a shell, wherein the shell is equipped with an exhaust discharge port at the top and a liquid outlet at the bottom. A plurality of glass tubes for circulating cooling medium are arranged in the shell along the long axis direction, and all the glass tube span between two side wall of the shell. One end of the glass tube located upstream of the cooling medium is head end, the other end located downstream of the cooling medium end is tail end, and adjacent glass tubes are connected end to end between the upstream and downstream of the cooling medium so as to form at least one unidirectional flow channel of the cooling medium. The unidirectional flow channel of the cooling medium formed by the glass tube can withstand high temperature and strong corrosion, thus ensuring the fluidity of the cooling medium and the safety of the heat exchanger in long term use. The glass tubes may be made of borosilicate glass tubes, quartz glass or other high temperature resistant and strong corrosive resistant glass.

Preferably, the upper part of the sulfuric acid steam condenser is further connected with the combustion furnace through a fan for providing hot air for the combustion furnace.

Preferably, a top exhaust outlet of the sulfuric acid steam condenser is further connected with an acid mist eliminator and an advance exhaust treatment system in turn (e.g., an exhaust scrubbing tower, which is provided with an external circulation loop formed by a circulating cooler and a circulating pump). The uncondensed acid process gas containing a small amount of $SO_2$ and a small amount of sulfuric acid is sent to the acid mist eliminator, and the exhaust after removing tiny droplets by the acid mist eliminator enters the advanced exhaust treatment system. A variety of mature wet flue gas desulfurization processes can be used in the advanced exhaust treatment system, such as ammonia desulfurization, calcium desulfurization, double alkali desulfurization and other new forms of desulfurization. All the desulfurization methods of the advanced exhaust treatment system can make the final exhaust meet the emission standards.

The present invention further provides a process for converting the sulfur-containing flue gas into sulfuric acid, which is carried out in the process system. The process comprises the following steps: preheating, pressuring and heating the sulfur-containing flue gas, performing catalytic oxidation to obtain $SO_3$, and then condensing; wherein, the sulfur-containing flue gas has a concentration of $SO_2$ higher than 0.1 mol %, and the catalytic oxidation has a temperature of above 390° C.

In the present invention, the feed gas is the low concentration of smelting sulfur-containing flue gas (hereinafter further referred to as acid process gas) obtained after the front end cooling and dedusting, temperature reduction and purification. In a preferred embodiment of this application, the sulfur-containing flue gas consists of 2% $SO_2$, 15.5% $O_2$, 3.6% $CO_2$, 77.5% $N_2$ and 1.4% $H_2O$, and the percentage is a molar percentage.

In the present invention, the sulfur-containing flue gas that enters the flus gas preheater has a dew point of 120~150° C. After passing through the flue gas preheater, the sulfur-containing flue gas is preheated to 15~30° C. above the dew point, preferably 140~170° C.

In the present invention, preferably, the pressure of the acid process gas preheated by the flue gas preheater is boosted to 115~125 kPa by the flue gas fan.

In the present invention, a combustion reaction of the acid process gas, fuel gas and hot air is carried out in the combustion furnace, where the acid process gas is heated by ignition to 900~1200° C. The hot air used herein may come from the sulfuric acid steam condenser.

In the present invention, in the combined reactor, the process gas containing $SO_2$ must be heated to above 390° C. before being introduced into the catalytic bed in order to achieve a more complete conversion reaction of $SO_2$ to $SO_3$, preferably the acid process gas entering the combined reactor has a temperature of 390~430° C. The catalyst used for the oxidation catalytic reaction occurring in the catalyst bed is a vanadium catalyst such as $V_2O_5$. The conversion rate of $SO_2$ can reach above 99% by the two-bed catalytic reaction. The order of catalytic reaction is preferably 2, but it can be adjusted according to the actual needs. Multiple catalyst beds can achieve a better equilibrium conversion rate.

In the present invention, the process gas after catalytic oxidation reaction is sent into the sulfuric acid steam condenser for condensation, the obtained product is cooled to a temperature greater than or equal to 10° C. above the dew point of $H_2SO_4$, then further cooled to 60° C.~120° C., and obtained $H_2SO_4$ product is collected. The cooled gas can be directly exhausted after coalescence and separation; preferably the further cooling has a temperature of 105° C.~120° C. After catalytic oxidation reaction, the process gas is cooled to a temperature higher than 10° C. above the dew point of $H_2SO_4$ by the conventional heat exchanger in the art, and the cold process gas or medium or low pressure saturated steam can further be used as a cooling medium to produce high-pressure saturated steam or superheated steam, which can further be used to reduce energy consumption. Wherein, the medium and low pressure saturated steam has a pressure of 0.5 MpaG~7.8 MpaG.

In the present invention, the obtained $H_2SO_4$ has a concentration of 93%~98%, which can be further adjusted to a constant concentration of an industrial-grade concentrated sulfuric acid according to specific needs for convenient use, and the percentage is a mass percentage.

On the basis of the common sense in the art, the above preferred conditions can be arbitrarily combined to obtain the preferred examples of the present invention.

The reagents and raw materials used in the present invention are commercially available.

The positive and progressive effect of the present invention is as follows: based on the technology of wet acid method, the present invention provides a process system for converting $SO_2$ from the smelting sulfur-containing flue gas, which cannot meet the relevant standard for emission, into $H_2SO_4$ to solve the problems that the low concentration of smelting sulfur-containing flue gas cannot be treated or cannot meet the relevant standard of emission; at the same time, it further solves the problems of high energy consumption and large equipment corrosion of the device for treating low concentration of smelting sulfur-containing flue gas. It has advantages of high desulfurization efficiency, fast reaction speed, simple process flow, low energy consumption, no secondary pollution, and producing high grade medium pressure steam as a by-product which can achieve certain economic benefits. It will be a widely used desulfurization technology.

The present invention utilizes the heat generated by the reaction of $SO_2$ conversion of the system itself to achieve the autothermal equilibrium. It realizes the effective use of energy and saves the investment of the device. At the same time, by burning combustible gas according to specific requirements, it can not only provide steam for other device, but also stabilize the $SO_2$ conversion reaction.

BRIEF DESCRIPTION OF THE DRAWINGS

In FIG. 1 and FIG. 2, marks are illustrated as follows:
flue gas preheater 1
flue gas fan 201
fan 202
combustion furnace 3
waste heat recycler 301
process gas steam heater 4
combined reactor 5
the first bed 501
interstage steam superheater 502
the second bed 503
process gas cooler 504
sulfuric acid steam condenser 6
acid mist eliminator 7
exhaust scrubbing tower 8
circulating cooler 801
circulating pump 802
steam drum 9

DETAILED DESCRIPTION OF THE PREFERRED EMBODIMENT

The present invention is further illustrated by the following examples, but the scope of the present invention is not limited therein. The experimental methods for which specific conditions are not indicated in the following examples shall be selected in accordance with the conventional methods and conditions or the commodity specifications.

EXAMPLE 1

The flue gas consists of 2% $SO_2$, 15.5% $O_2$, 3.6% $CO_2$, 77.5% $N_2$ and 1.4% $H_2O$, and the percentage is a molar percentage.

Figure 1:
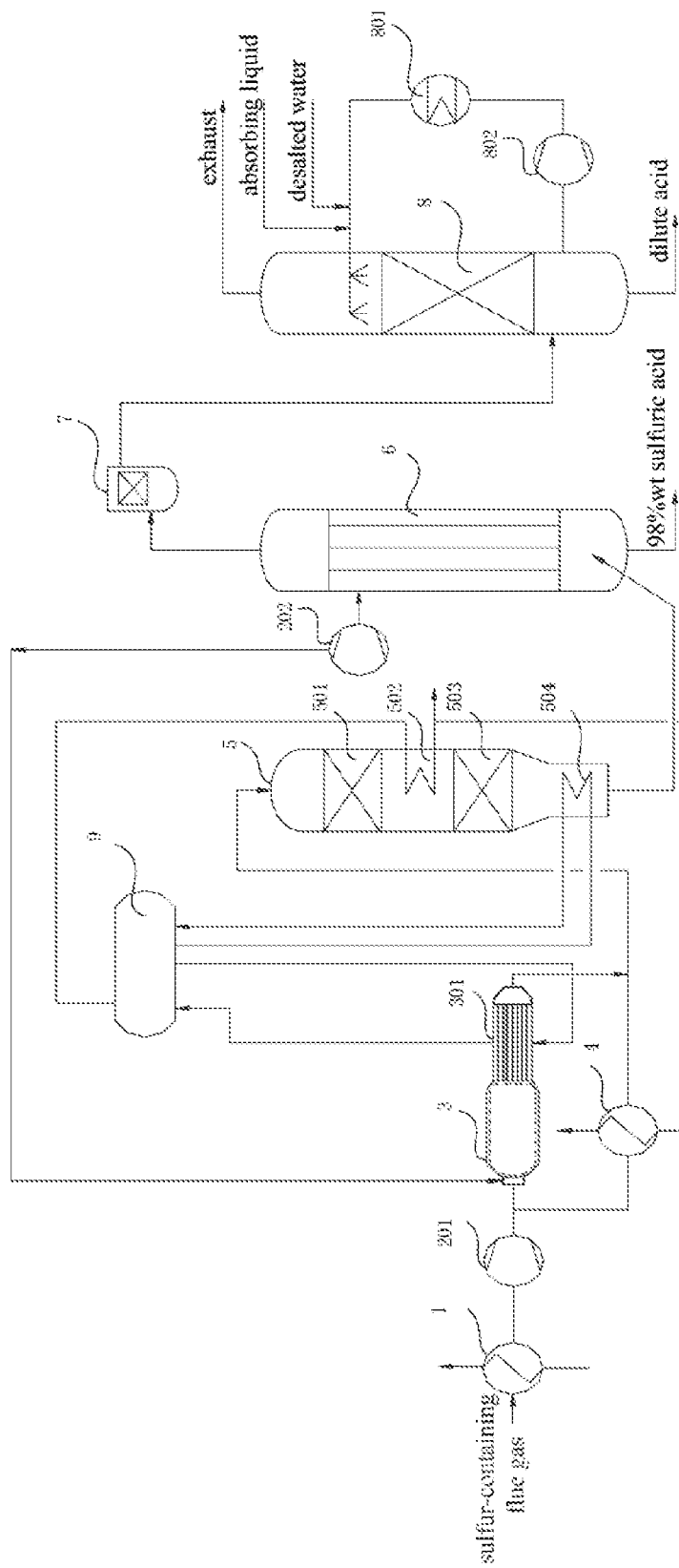
FIG. 1 is a flowchart of the process system for converting sulfur-containing flue gas into sulfuric acid in Example 1

As shown in FIG. 1, the active components of the catalyst for converting $SO_2$ into $SO_3$ is mostly $V_2O_5$. The sulfur-containing flue gas needs to reach a certain reaction temperature before entering the catalyst. The flue gas in the front section is preheated, and the heat of the flue gas preheating first comes from the heat generated by the condensation of sulfuric acid, and the heat generated by the waste pot and the heat released from each reaction bed can be used subsequently. See drawing for the detailed process.

After front end cooling and dedusting, temperature reduction and purification, the low concentration of smelting sulfur-containing flue gas (hereinafter referred to acid process gas) enters the cold end inlet of the flue gas preheater 1, an the acid process gas is preheated to 165° C. The hot end of the flue gas preheater 1 is the hot air from the cold end outlet of the sulfuric acid steam condenser 6. The acid process gas preheated by the flue gas preheater 1 is then boosted to 118 kPa by the flue gas fan 201.

The acid process gas with boosted pressure is divided into two streams using a split flow, and then enters the combustion furnace 3 and the process gas steam heater 4 respectively for heating. One stream of the acid process gas, the fuel gas and the hot air enter the combustion furnace 3 for combustion and heating to 1050° C., then enter into the pipe side of the waste heat recycler 301 for cooling and heat recovery. The waste heat recycler 301 uses a shell and tube heat exchanger, and all the heat exchange pipes are immersed in boiler feed water. 5.6 MPag medium pressure saturated steam is generated outside the heat exchange tube; the other stream of the acid process gas enters the process gas steam heater 4 for heating. The hot end of the process gas steam heater 4 uses superheated steam from the outlet of the interstage steam superheater 502 of the combined reactor 5 to heat the acid process gas. The acid process gas heated by the waste heat recycler 301 and by the process gas steam heater 4 are mixed and sent to the inlet of the first bed 501 of the combined reactor 5 after reaching the best reaction temperature of 420° C.

The acid process gas mixed from the waste heat recycler 301 and the process gas steam heater 4 enters the inlet of the first bed 501 of the combined reactor 5. Under the action of catalyst, $SO_2$ is converted into $SO_3$. This reaction process is a strong exothermic reaction, so the temperature of the acid process is increased after leaving the first bed 501 of the combined reactor 5. The acid process gas from the outlet of the first bed 501 of the combined reactor 5 enters the shell side of the interstage steam superheater 502 for cooling and heat recovery. The saturated steam from the medium pressure steam drum 9 enters the cold end of the interstage steam superheater 502 to recover the heat generated by the acid process gas reaction. The superheated steam after the heating of the interstage steam superheater 502 is divided into two streams: one stream of steam is sent out of the boundary area as the final steam product; The other stream of steam is sent to the process gas steam heater 4 as a heat source to heat up the acid process gas, which condenses itself into saturated and condensate water and is sent out of the boundary area.

The acid process gas cooled by the interstage steam superheater 502 to recover heat enters the inlet of the second bed 503 of the combined reactor 5. $SO_2$ in the acid process gas is further converted. After reaction i the second bed 503 of the combined reactor 5, the acid process gas enters the process gas cooler 504 for cooling. The cold end of the process gas cooler 504 uses the circulating boiler feed water from the steam drum 9. The circulating boiler feed water exchanges heat with the acid process gas, then vaporizes and returns to steam drum 9 for flash evaporation to produce 5.6 MPag medium pressure saturated steam.

The acid process gas from the process gas cooler 504 is sent to the sulfuric acid steam condenser 6 for condensing into acid, and the product is cooled to 10° C. above the dew point of $H_2SO_4$, and then further cooled to 110° C. $H_2SO_4$ products are collected, and the gas obtained after cooling is coalesced and separated, and then directly exhausted. In this process, the gaseous $SO_3$ is combined with water to form sulfuric acid and condensed to form 98% concentrated sulfuric acid. The upper part of the sulfuric acid steam condenser 6 is further connected with the combustion furnace 3 through a fan 202 for supplying hot air for the combustion furnace 3.

The uncondensed acid process gas containing a small amount of $SO_2$ and a small amount of sulfuric acid is sent to the acid mist eliminator, and the exhaust after removing tiny droplets by the acid mist eliminator enters the advanced exhaust treatment system (e.g, an exhaust scrubbing tower 8, in which an external circulation loop formed by a circulating cooler 801 and a circulating pump 802 is arranged). The advanced exhaust gas treatment system can adopt a variety of mature wet flue gas desulfurization processes, such as ammonia desulfurization, calcium desulfurization, double alkali desulfurization and other new forms of desulfurization.

The heat exchange network in this example is relatively complex, but self-heat balance can be completely realized, with less fuel gas consumption. The acid process gas adopts a shunt measure, and the fuel gas and its own by-product steam are respectively used to heat the acid process gas to the optimal reaction temperature of the $SO_2$ catalyst, which can resist the fluctuation of the sulfur-containing flue gas $SO_2$, and stabilize the operation of the device.

COMPARATIVE EXAMPLE 1

The flue gas consists of 1% $SO_2$, 16.12% $O_2$, 3.3% $CO_2$, 78.07% $N_2$, 1.2% $H_2O$, and other 0.31%, and the percentage is a molar percentage.

Figure 2:
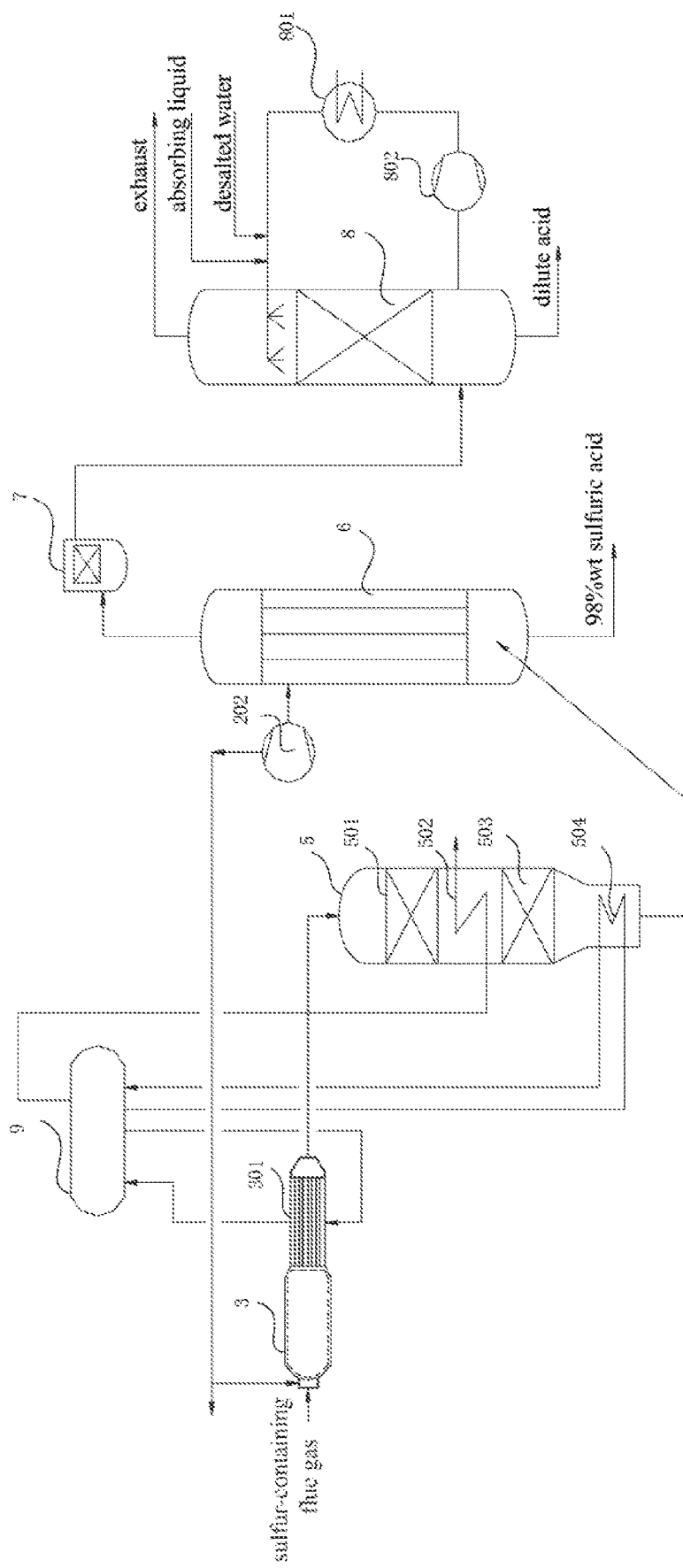
FIG. 2 is a flowchart of the process system for converting sulfur-containing flue gas into sulfuric acid in comparative Example 1.

As shown in FIG. 2, the active components of the catalyst for converting $SO_2$ into $SO_3$ is mostly $V_2O_5$. The sulfur-containing flue gas needs to reach a certain reaction temperature before entering the catalyst. The process gas in the front section is heated by burning fuel gas and hot air, and the heat of combustion can further be recovered by the waste heat recycler 301. See drawing for the detailed process.

After front end cooling and dedusting, temperature reduction and purification, and concentration, the low concentration of smelting sulfur-containing flue gas (hereinafter referred to acid process gas) and the hot air and the fuel gas from the combustion fan 202 enter the combustion furnace 3 for combustion with a combustion temperature of 1025° C., and then enter the pipe side of the waste heat recycler 301 for cooling and heat recovery. The waste heat recycler 301 uses a shell and tube heat exchanger, and all the heat exchange pipes are infiltrated into boiler feed water. 5.6 MPag of medium pressure saturated steam is generated outside the heat exchange tube. The acid process gas is sent to the inlet of the first bed 501 of the combined reactor 5 when the acid process temperature after heat recovery by the waste heat recycler 301 reached the optimal reaction temperature of 423° C.

The acid process gas from the waste heat recycler 301 enters the inlet of the first bed 501 of the combined reactor 5, and under the action of catalyst, $SO_2$ is converted into $SO_3$. This reaction process is a strong exothermic reaction, so the temperature of the acid process gas is increased after leaving the first bed 501 of the combined reactor 5. The acid process gas from the outlet of the first bed 501 of the combined reactor 5 enters the shell side of the interstage steam superheater 502 for cooling and heat recovery. The saturated steam from the medium pressure steam drum 9 enters the cold end of the interstage steam superheater 502 to recover the heat generated by the acid process gas reaction. The superheated steam heated by the interstage steam superheater 502 is sent out of the boundary area as a steam product.

The acid process gas cooled by the interstage steam superheater 502 to recover heat enters the inlet of the second bed 503 of the combined reactor 5. $SO_2$ in the acid process gas is further converted. After reaction in the second bed 503 of the combined reactor 5, the acid process gas enters the process gas cooler 504 for cooling. The cold end of the process gas cooler 504 uses the circulating boiler feed water from the steam drum 9. The circulating boiler feed water exchanges heat with the acid process gas, then vaporizes and returns to the steam drum 9 for flash evaporation to produce 5.6 MPag of medium pressure saturated steam.

The acid process gas from the process gas cooler 504 is sent to the sulfuric acid steam condenser 6 for condensing to acid. In this process, the gaseous $SO_3$ is combined with water to form sulfuric acid and condensed to form 98% concentrated sulfuric acid.

The uncondensed acid process gas containing a small amount of $SO_2$ and a small amount of sulfuric acid is sent to the acid mist eliminator, and the exhaust after removing tiny droplets by the acid mist eliminator enters the advanced exhaust treatment system (e.g., an exhaust scrubbing tower 8, in which an external loop formed by a circulating cooler 801 and a circulating pump 802 is arranged). The advanced exhaust gas treatment system can adopt a variety of mature wet flue gas desulfurization processes, such as ammonia desulfurization, calcium desulfurization, double alkali desulfurization and other new forms of desulfurization.

The heat exchange network in the comparative example is simple, but it will consume more fuel gas to supplement heat, and correspondingly, the combustion furnace 3 and the waste heat recycler 301 are larger in size.

According to the above analysis, the low concentration of smelting sulfur-containing flue gas and flue gas containing $SO_2$ in various chemical devices are purified and then enter the described process system and device to solve the problem that current low concentration of flue gas anti-fluctuation has poor ability and cannot meet the existing relevant standards for emission of $SO_2$-containing flue gas, and simultaneously produce sulfuric acid products and high grade superheated steam. The present invention not only solves the problems in environmental protection, but also produces certain economic benefits.

What is claimed is:

1. A process system for converting sulfur-containing flue gas into sulfuric acid, wherein, the process system comprises:
   a flue gas preheater for preheating the sulfur-containing flue gas to 15~30° C. above its dew point, wherein the flue gas preheater has a glass tube as a heat exchange tube;
   a flue gas fan for boosting the pressure of the preheated acid process gas from the flue gas preheater, and transporting one part of which to a combustion furnace, and the other part of which to a process gas steam heater, wherein the combustion furnace and the process gas steam heater are used for heating the preheated acid process gas to catalytic oxidation temperature of $SO_2$;
   the combustion furnace and the process gas steam heater are connected in parallel with a combined reactor, which is used for generating $SO_3$ by catalytic oxidation of $SO_2$ in the acid process gas;
   a sulfuric acid steam condenser for condensing $SO_3$ generated by the combined reactor into sulfuric acid; the cold end of the sulfuric acid steam condenser is further connected with the flue gas preheater for providing hot air to the flue gas preheater.

2. The process system as defined in claim 1, wherein, the combustion furnace is further provided with a waste heat recycler for converting the heat of high-temperature flue gas in the combustion furnace into saturated steam.

3. The process system as defined in claim 2, wherein, the combined reactor is provided with a first bed, an interstage steam superheater, a second bed and a process gas cooler from top to bottom, and the waste heat recycler and the process gas steam heater are connected with the first bed after being paralleled connected; the outlet of the interstage steam superheater is further connected with the hot end of the process gas steam heater, and superheated steam is used for a heating process of the acid process gas.

4. The process system as defined in claim 3, wherein, the process system further comprises a steam drum, and the steam drum and the waste heat recycler are connected to form a first waste heat collection circuit, the steam drum and the process gas cooler are connected to form a second waste heat collection circuit, and the steam drum is further connected to the interstage steam superheater, so that the saturated steam from the steam drum enters the cold end of the interstage steam superheater to recover heat generated by acid process gas reaction.

5. The process system as defined in claim 1, wherein, the upper part of the sulfuric acid steam condenser is further connected with the combustion furnace through a fan for providing hot air for the combustion furnace.

6. The process system as defined in claim 1, wherein, a top exhaust outlet of the sulfuric acid steam condenser is further connected with an acid mist eliminator and an advance exhaust treatment system in turn.

7. A process for converting sulfur-containing flue gas into sulfuric acid, wherein, the process is carried out in the process system as defined in claim 1, and comprising the following steps: preheating, pressuring and heating, and then subjecting the sulfur-containing flue gas to catalytic oxidation to obtain $SO_3$, and then condensing; wherein the sulfur-containing flue gas has a concentration of $SO_2$ higher than or equal to 0.1 mol %, and the catalytic oxidation has a temperature of above 390° C.

8. The process as defined in claim 7, wherein, the sulfur-containing flue gas consisting of: 2% $SO_2$, 15.5% $O_2$, 3.6% $CO_2$, 77.5% $N_2$, 1.4% $H_2O$, and the percentage is a molar percentage;
   the sulfur-containing flue gas that enters the flue gas preheater has a dew point of 120~150° C.; after passing through the flue gas preheater, preheating the sulfur-containing flue gas to 15~30° C. above the dew point;
   boosting the pressure of the acid process gas preheated by the flue gas preheater to 115~125 kPa by the flue gas fan;
   carrying out a combustion reaction of the acid process gas, fuel gas and hot air in the combustion furnace, where the acid process gas is heated by ignition to 900~1200° C.

9. The process as defined in claim 7, wherein, the acid process gas that enters the combined reactor has a temperature of 390~430° C.; the catalytic oxidation has a reaction order of 2;
   sending the process gas after catalytic oxidation reaction into the sulfuric acid steam condenser for condensation, cooling obtained product to 10° C. above the dew point of $H_2SO_4$, then further cooling to 60° C.~120° C., and collecting obtained $H_2SO_4$, coalescing and separating, and directly exhausting cooled gas.

10. The process as defined in claim 7, wherein, the obtained $H_2SO_4$ has a concentration of 93%~98%, and the percentage is a mass percentage.

11. A process for converting sulfur-containing flue gas into sulfuric acid, wherein, the process is carried out in the process system as defined in claim 2, and comprising the following steps: preheating, pressuring and heating, and then subjecting the sulfur-containing flue gas to catalytic oxidation to obtain $SO_3$, and then condensing; wherein the sulfur-containing flue gas has a concentration of $SO_2$ higher than or equal to 0.1 mol %, and the catalytic oxidation has a temperature of above 390° C.

12. A process for converting sulfur-containing flue gas into sulfuric acid, wherein, the process is carried out in the process system as defined in claim 3, and comprising the following steps: preheating, pressuring and heating, and then subjecting the sulfur-containing flue gas to catalytic oxidation to obtain $SO_3$, and then condensing; wherein the sulfur-containing flue gas has a concentration of $SO_2$ higher than or equal to 0.1 mol %, and the catalytic oxidation has a temperature of above 390° C.

13. A process for converting sulfur-containing flue gas into sulfuric acid, wherein, the process is carried out in the process system as defined in claim 4, and comprising the following steps: preheating, pressuring and heating, and then subjecting the sulfur-containing flue gas to catalytic oxidation to obtain $SO_3$, and then condensing; wherein the sulfur-containing flue gas has a concentration of $SO_2$ higher than or equal to 0.1 mol %, and the catalytic oxidation has a temperature of above 390° C.

14. A process for converting sulfur-containing flue gas into sulfuric acid, wherein, the process is carried out in the process system as defined in claim 5, and comprising the following steps: preheating, pressuring and heating, and then subjecting the sulfur-containing flue gas to catalytic oxidation to obtain $SO_3$, and then condensing; wherein the sulfur-containing flue gas has a concentration of $SO_2$ higher than or equal to 0.1 mol %, and the catalytic oxidation has a temperature of above 390° C.

15. A process for converting sulfur-containing flue gas into sulfuric acid, wherein, the process is carried out in the process system as defined in claim 6, and comprising the following steps: preheating, pressuring and heating, and then subjecting the sulfur-containing flue gas to catalytic oxidation to obtain $SO_3$, and then condensing; wherein the sulfur-containing flue gas has a concentration of $SO_2$ higher than or equal to 0.1 mol %, and the catalytic oxidation has a temperature of above 390° C.

16. The process as defined in claim 8, wherein, the sulfur-containing flue gas that enters the flue gas preheater has a dew point of 120~150° C.; after passing through the flue gas preheater, preheating the sulfur-containing flue gas to 140~170° C.

17. The process as defined in claim 9, wherein, the further cooling has a temperature of 105° C.~120° C.

* * * * *